(12) United States Patent
Favre

(10) Patent No.: US 8,869,970 B2
(45) Date of Patent: Oct. 28, 2014

(54) TAPERED SCRAPER FOR A CONVEYOR BELT

(71) Applicant: Laitram, L.L.C., Harahan, LA (US)

(72) Inventor: Clint T. Favre, Forest Hill, MD (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 13/669,066

(22) Filed: Nov. 5, 2012

(65) Prior Publication Data

US 2014/0124333 A1    May 8, 2014

(51) Int. Cl.
*B65G 45/12*    (2006.01)

(52) U.S. Cl.
USPC .......................................... 198/497; 198/493

(58) Field of Classification Search
USPC .................................. 198/497, 499
See application file for complete search history.

(56) References Cited

U.S. PATENT DOCUMENTS

| | | | |
|---|---|---|---|
| 5,222,589 A * | 6/1993 | Gordon | 198/497 |
| 5,797,477 A * | 8/1998 | Veenhof | 198/499 |
| 5,975,281 A | 11/1999 | Yoshizako et al. | |
| 5,979,638 A * | 11/1999 | Wiggins | 198/497 |
| 6,349,816 B1 * | 2/2002 | Tenzer et al. | 198/497 |
| 6,354,428 B1 | 3/2002 | Gibbs et al. | |
| 6,644,463 B2 | 11/2003 | Mott | |
| 7,798,310 B2 | 9/2010 | Veenhof | |
| 7,866,457 B2 | 1/2011 | Swinderman et al. | |
| 7,950,519 B2 | 5/2011 | DeVries et al. | |
| 8,028,819 B1 | 10/2011 | Swinderman | |
| 8,123,022 B2 | 2/2012 | Mott et al. | |
| 2004/0188224 A1 | 9/2004 | Kolodziej | |
| 2011/0220461 A1 | 9/2011 | Kirschner | |
| 2012/0012535 A1 * | 1/2012 | Taylor | 210/747.6 |

FOREIGN PATENT DOCUMENTS

| | | | |
|---|---|---|---|
| DE | 19603934 C1 | 8/1997 | |
| DE | 10301230 A1 * | 8/2004 | |
| DE | 102007033854 A1 | 1/2008 | |
| EP | 1044902 A2 * | 10/2000 | B65G 45/12 |

OTHER PUBLICATIONS

International Search Report and PCT/US2013/068256, mailed Feb. 5, 2014, European Patent Office, Rijswijk, NL, No written opinion.

* cited by examiner

*Primary Examiner* — Ramya Burgess
*Assistant Examiner* — Lester Rushin
(74) *Attorney, Agent, or Firm* — Catherine M. Bishop

(57) ABSTRACT

A conveyor belt scraper includes a non-linear scraping edge for directing product towards the center of the scraper. The non-linear scraping edge comprises two obliquely extending portions that intersect at an obtuse angle to define a nadir of a channel. The non-linear scraping edge is formed at the top end of a curved inner surface that abuts a conveyor belt wrapped around a reversing element. Channeling surfaces are formed between the non-linear scraping edge and an outer surface of the scraper. The scraping edge and channeling surfaces direct product away from the conveyor belt and over the outer surface of the scraper.

21 Claims, 5 Drawing Sheets

TAPERED SCRAPER FOR A CONVEYOR BELT

BACKGROUND

The invention relates generally a belt scraper for cleaning a conveyor belt.

Conveyor belt systems typically include a cleaning system for removing debris and other materials from the outer surface of the conveyor belt. For example, scraper blades in contact with the belt surface may be used to remove material deposits from the belt surface. A typical scraper has a metallic or flexible plastic, e.g., polyurethane, body that is mounted on a support shaft that spans a conveyor belt and that usually includes a tensioner that biases the scraper into engagement with the conveyor belt to allow them to scrape leavings off of the belt and yet resiliently shift away from the belt when surface irregularities on the belt are encountered.

Most conveyor belt scraper blades include a linear scraping edge spanning the width of the conveyor belt. The linear scraping edge engages the outer surface of the conveyor belt at a ninety degree angle. The linear scraping edge at times may clog with debris, as product may tend to stick to the scraper blade.

SUMMARY

The present invention provides a conveyor belt scraper having a non-linear scraping edge designed to channel debris away from a conveyor belt towards the middle of the scraper and away from a conveyor belt. The non-linear scraping edge comprises two obliquely extending portions that intersect to define a nadir of a channel. The scraper comprises a base and a tapering scraper tip terminating in the non-linear scraping edge. The tapering scraper tip comprises a curved inner surface that terminates in the non-linear scraping edge, a curved outer surface, flat side surfaces and a channeling surface extending between the non-linear scraping edge and curved outer surface.

According to one aspect of the invention, a scraper for a conveyor belt comprises a base and a tapering scraper tip extending from the base. The tapering scraper tip terminates in a non-linear scraping edge comprising two obliquely-extending portions that intersect at an obtuse angle to define a channel.

According to another aspect of the invention, a scraper for a conveyor belt comprises a base and a tapering scraper tip. The tapering scraper tip comprises a curved inner surface extending from the base, an outer surface opposing the curved inner surface, tapering side surfaces between the curved inner surface and the outer surface and twisting channeling surfaces extending between top edges of the curved inner surface and the outer surface.

According to another aspect of the invention, a conveyor for conveying product comprises a frame, a reversing element coupled to the frame, a conveyor belt trained around the reversing element and a scraper for removing debris from the conveyor belt. The scraper has a scraper tip having a curved inner surface abutting the conveyor belt, the curved inner surface terminating in a non-linear scraping edge.

BRIEF DESCRIPTION OF THE DRAWINGS

These features and aspects of the invention, as well as its advantages, are described in more detail in the following description, appended claims, and accompanying drawings, in which:

DETAILED DESCRIPTION

Figure 1:
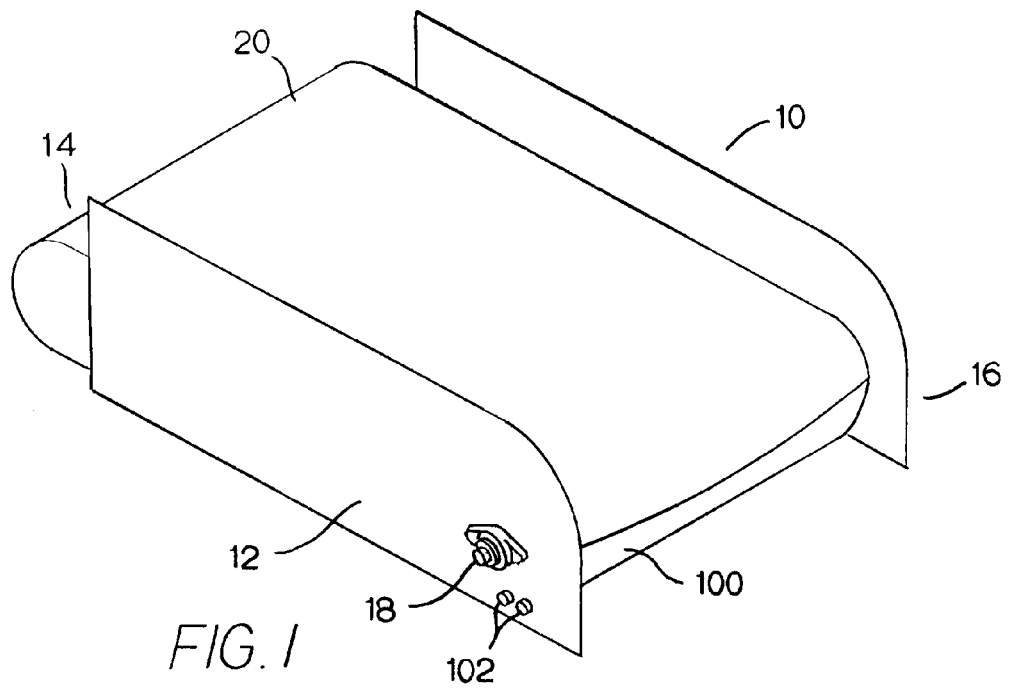
FIG. 1 is an isometric view of a conveying system including a tapered scraper according to an embodiment of the invention.
Figure 2:
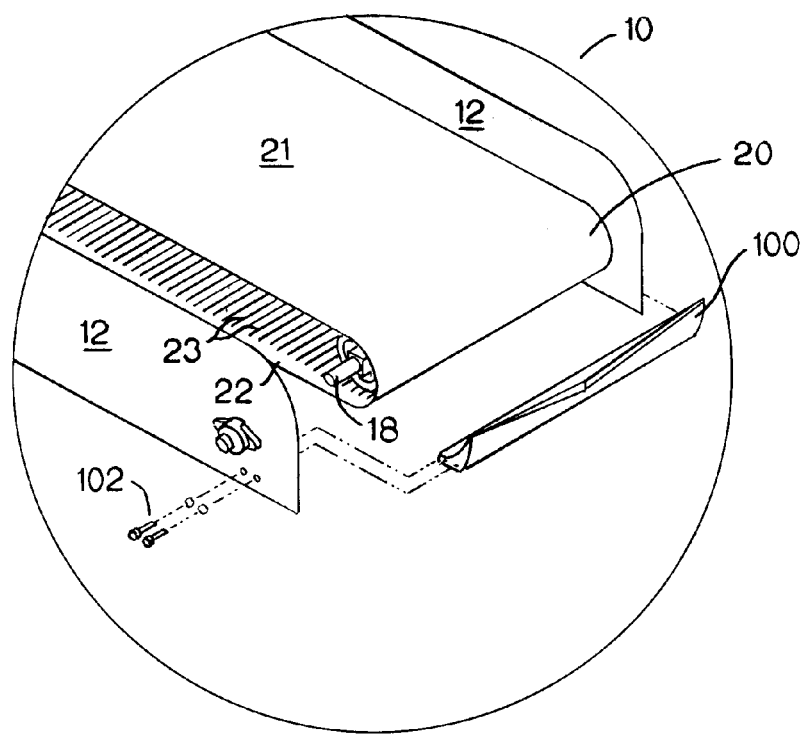
FIG. 2 is an exploded view of the conveying system of FIG. 1.

The present invention provides an improved conveyor belt scraper for removing product and-or debris from a conveyor belt. The invention will be described relative to certain illustrative embodiments.

FIGS. 1-4 illustrate a conveying system 10 including a conveyor belt 20 and a conveyor belt scraper 100. The conveying system 10 includes a conveyor frame 12 for supporting the conveyor belt. The conveyor belt travels between a first end 14 and a second end 16, conveying articles along a carryway. The conveyor belt may be conventionally trained around reversing elements at each end of the carryway and returned along a returnway below the carryway. The illustrative reversing elements comprise an idle sprocket at a first end and a motor-driven sprocket 28 at a second end, though the reversing element may alternatively comprise a drum, pulley, nosebar, curved bar or other suitable element for guiding the conveyor belt between the carryway and returnway. The conveyor belt includes an outer surface 21 forming a conveying surface and an inner surface 22 that may include teeth 23 for engaging a sprocket 28. The illustrative sprocket 28 is mounted to and rotates about shaft 18, which extends into the frame 12 for coupling the sprocket to the frame.

The illustrative conveyor belt 20 is a low tension, direct drive conveyor belt, such as the Thermodrive® belt available from Intralox, LLC of Harahan, La. Alternatively, the conveyor belt may be a modular plastic conveyor belt, tension-driven flat belt, slat belt or any other suitable type of conveyor belt.

Figure 4:
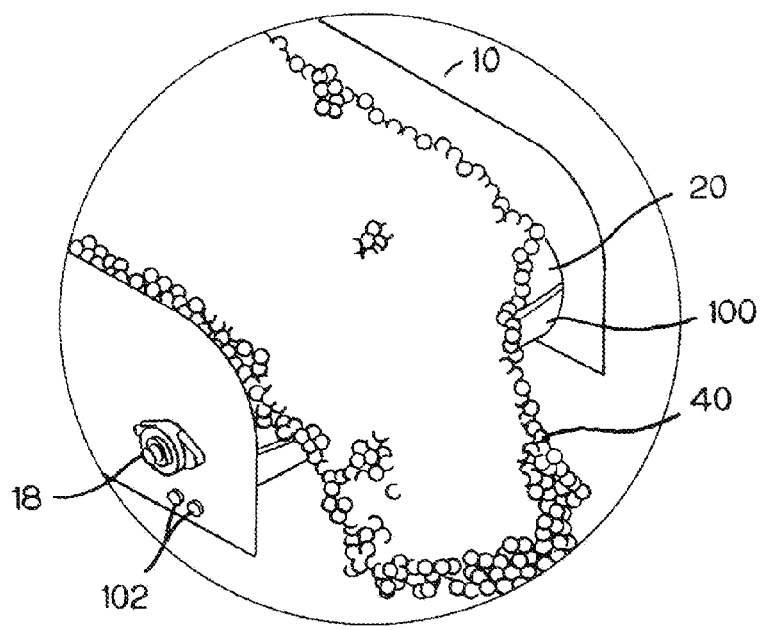
FIG. 4 illustrates the conveying system of FIG. 1 while conveying and transferring a product over the end of the conveyor.
Figure 5:
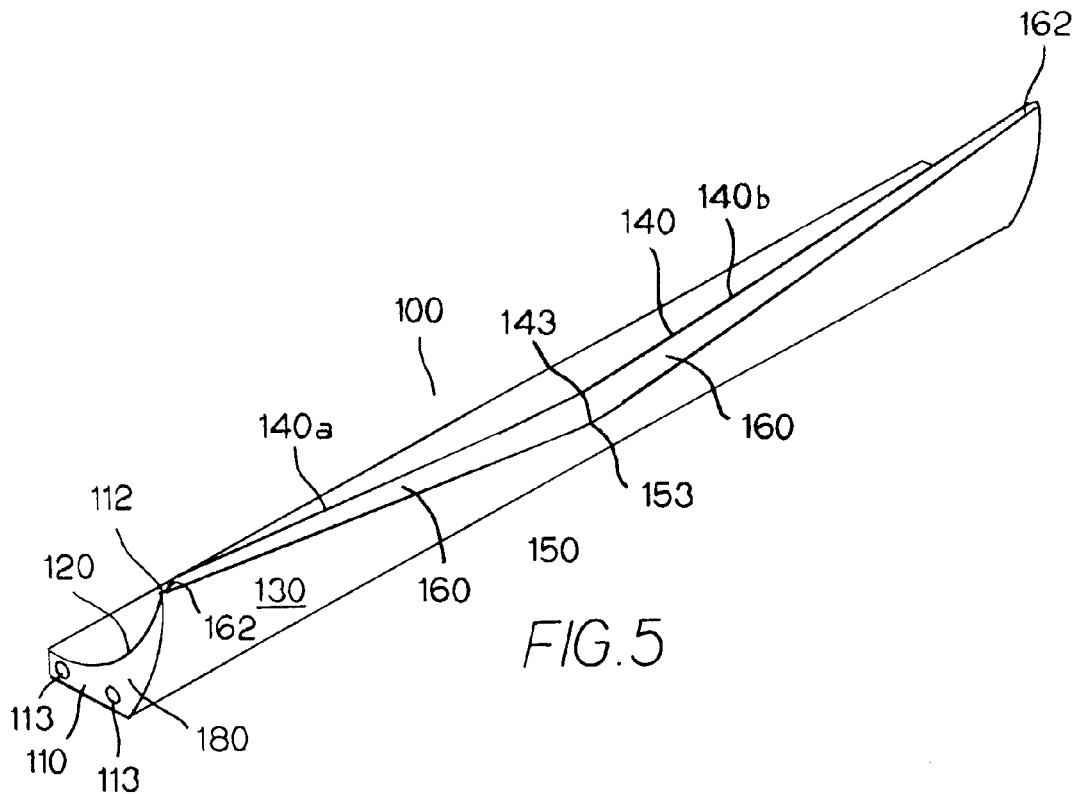
FIG. 5 is an isometric view of a tapered scraper having a non-linear scraping edge according to one embodiment of the invention.
Figure 6:
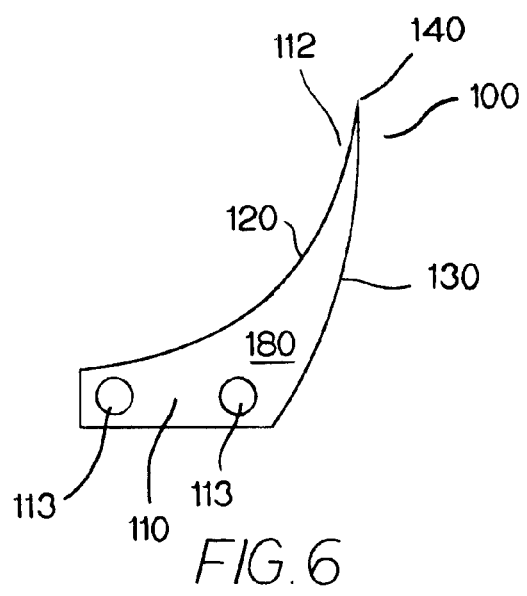
FIG. 6 is a side view of the tapered scraper of FIG. 5.
Figure 7:
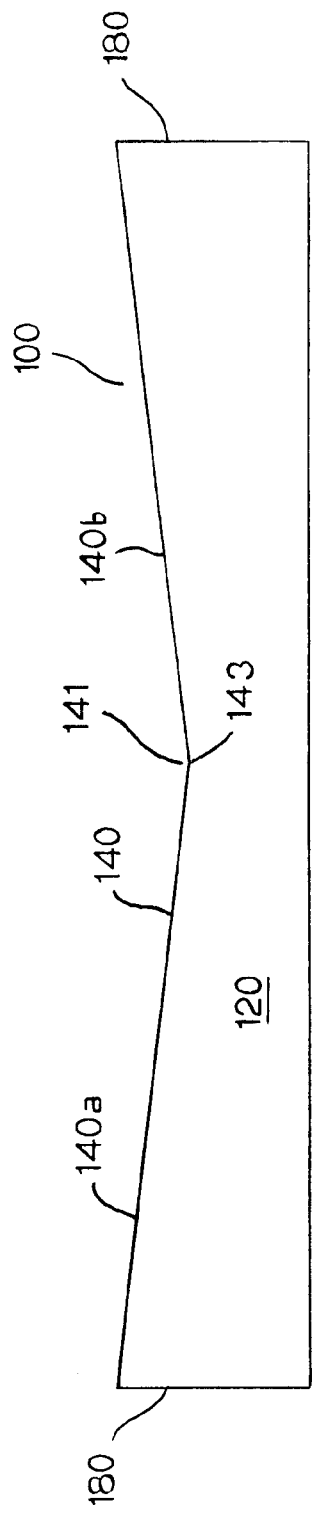
FIG. 7 is a front view of the tapered scraper of FIG. 5.
Figure 8:
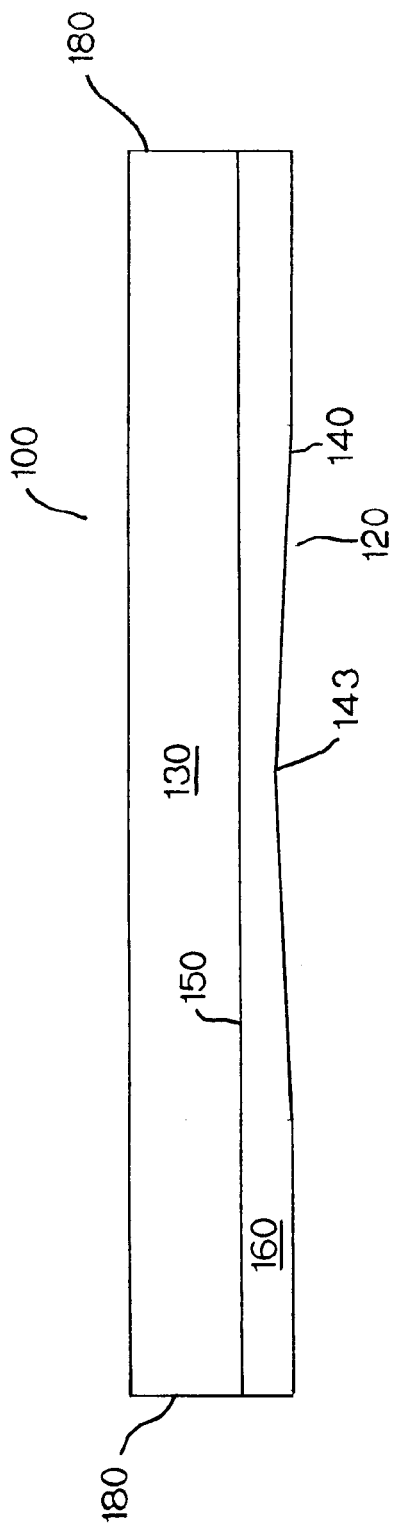
FIG. 8 is a top view of the tapered scraper of FIG. 5.

A cleaning system, comprising a scraper 100, is mounted to the second end 16 of the frame 12. The scraper 100 removes material 40, as shown in FIG. 4, from the outer surface 21 of the conveyor belt 20 as the belt moves over the sprocket 28 or other reversing element.

As shown in FIGS. 5-8, the scraper 100 is a solid body including a base 110 and integrated tapering scraper tip 112 defining a blade. The base includes side openings 113 for receiving fasteners 102 to fasten the scraper 100 to the conveyor frame 12, preferably between the two sides of the frame. The illustrative fasteners 102 comprise screws and washers, though any suitable fastening mechanism may be used.

Figure 3:
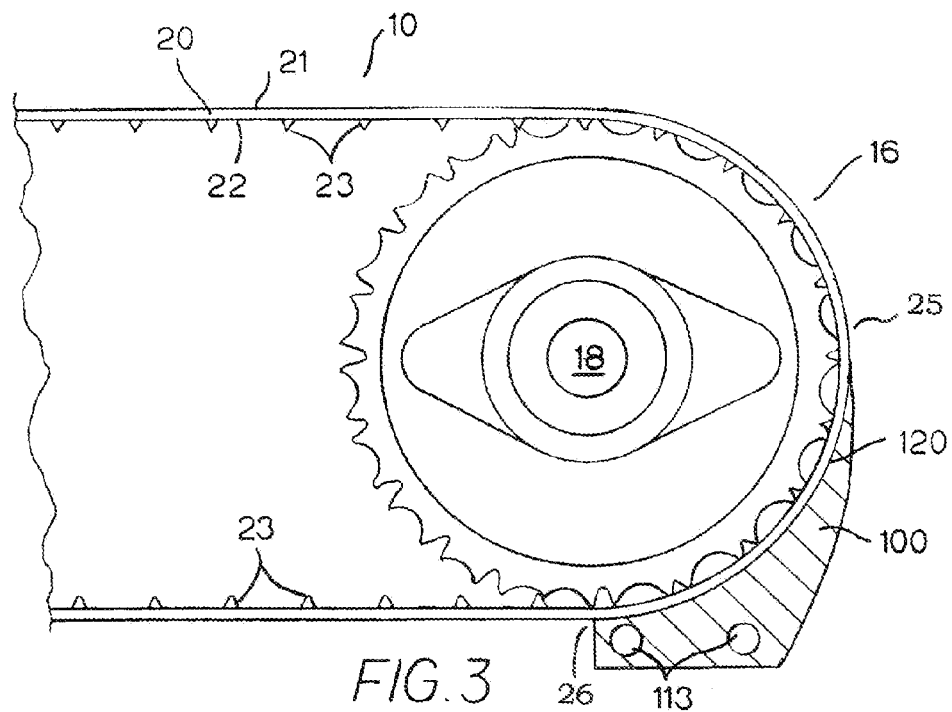
FIG. 3 is a side view of an end portion of the conveying system of FIG. 1.

The tapering scraper tip 112 is defined by two curved surfaces: an inner curved surface 120 and an outer curved surface 130. The inner curved surface 120 abuts the outer conveying surface 21 of the conveyor belt 20, and matches the profile of the belt on the underside of a sprocket 28, as shown in FIG. 3 or other reversing element. The inner curved surface 120 extends through an arc of about 90°, starting at the apex 25 of the conveyor belt curve and ending at the point 26 where the conveyor belt enters the returnway and flattens. Flat side surfaces 180 extend between the curved inner surface 120 and curved outer surface 130. The flat side surfaces 180 may abut the interior sides of the frame or may be spaced inwards from the frame 12.

The curved inner surface 120 terminates in a scraping edge 140 at the top. The scraping edge 140 contacts the belt to scrape away product and debris. The scraping edge 140 is preferably non-linear to facilitate removal of product. The illustrative scraping edge 140 is v-shaped, forming a channel 141 (see FIG. 7) for directing product to, and over, the outer curved surface 130. The scraping edge 140 comprises two obliquely-extending portions 140a, 140b that converge at a middle nadir 143. In the illustrative embodiment, the two obliquely-extending portions 140a, 140b intersect at an obtuse angle so that the channel 141 is fairly shallow. In the embodiments of FIGS. 5-8, the obliquely-extending portions 140a, 140b extend from the flat side surfaces 180 towards the middle of the scraper 100. While the nadir 143 is located in the middle of the scraper, alternatively, the nadir 143 may be offset from the middle and be disposed closer to one of the flat surfaces 180 than the other.

As the conveyor belt 10 articulates about a sprocket or other reversing element, the outside points of the scraping edge 140 contact the conveyor belt first, channeling debris towards the lower middle point 143 and away from the conveyor belt surface 21. The middle point 143 contacts the conveyor belt surface last and channels the debris towards the curved outer surface 130.

The curved outer surface 130 terminates in an outer edge 150 at the top. The outer edge 150 is also v-shaped, or includes a v-shaped portion. In the illustrative embodiment, the low point 153 of the outer edge 150 is lower than the low point 143 of the scraping edge 140.

Channeling surfaces 160 extend between the scraping edge 140 and the outer edge 150 and direct product away from the conveyor belt and over the outer surface 130. The channeling surfaces 160 taper from a widest point at the bottom, between nadirs 143 and 153, to tips 162, which are closest to the flat side surfaces 180 of the scraper 100. The tips 162 may be pointed, such that the outer surface 130 directly intersects the inner surface 120, or may be blunted, with the tapered outer surface 160 extending between the outer surface 130 and inner surface 120. In this manner, the channeling surfaces gradually widen as more material is channeled down the channel 141 and over the curved outer surface 130.

The channeling surfaces 160 may twist away from the inner surface 120 from tips 162 to the middle 143 to facilitate product removal.

Figure 9:
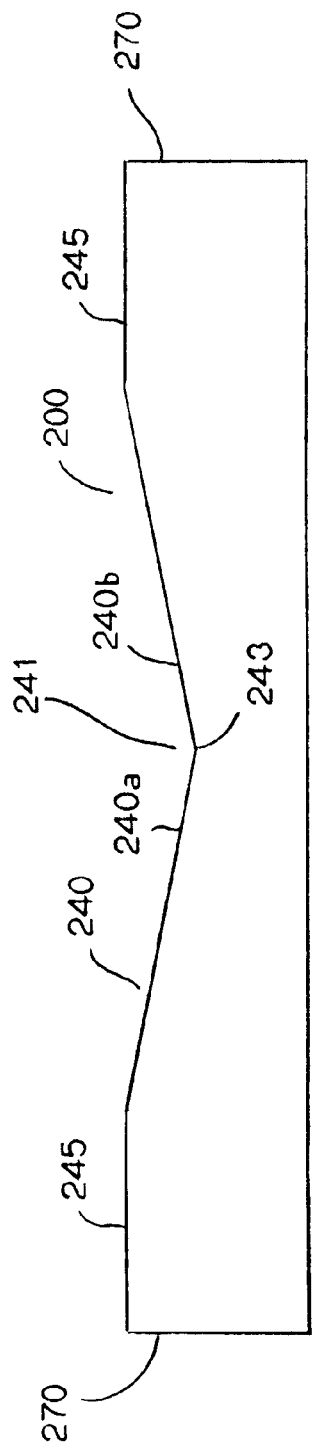
FIG. 9 is a front view of a tapered scraper for a conveyor belt according to another embodiment of the invention.
Figure 10:
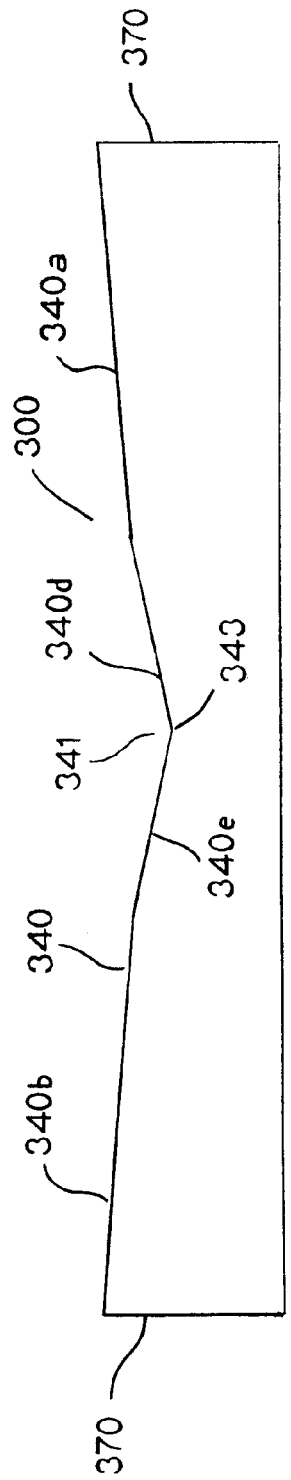
FIG. 10 is a front view of another embodiment of a tapered scraper for a conveyor belt.

The non-linear scraping edge is not limited to the v-shaped embodiment. For example, FIGS. 9 and 10 are front views of another embodiment of a tapered scraping blade including a non-linear scraping edge. As shown in FIG. 9, a non-linear scraping edge 240 of a scraper 200 may include obliquely-extending portions 240a, 240b that converge at a middle nadir 243 to form a product channel 241. The illustrative intersection of the two obliquely-extending portions 240a, 240b forms an obtuse angle. The obliquely-extending portions do not extend all the way to the side surfaces 270 of the scraper. In the embodiment of FIG. 9, the scraping edge 240 includes linear portions 245 extending between the obliquely-extending portions 240a, 240b and the side surfaces 270 of the scraper 100. The linear portions 245 may extend substantially perpendicular to the conveyor belt direction of travel.

In another embodiment, shown in FIG. 10, a non-linear scraping edge 340 of a scraper 300 includes two sets of obliquely-extending portions. Outer obliquely-extending portions 340a, 340b extend at a first angle from the side surfaces 370 of the scraper. Inner obliquely-extending portions 340c, 340d extend at a second angle from the outer portions 340a, 340b and converge at a middle nadir 343 to form a product channel 341. The intersection of the inner obliquely-extending portions 340c, 340d may define an obtuse angle.

The v-shaped portion of a non-linear scraping edge channels debris from a conveyor belt surface and effectively cleans the conveyor belt.

Although the invention has been described in detail with reference to a few exemplary versions, other versions are possible. So, as these few examples suggest, the scope of the claims is not meant to be limited to the versions described in detail.

What is claimed is:

1. A scraper for a conveyor belt, comprising:
   a base; and
   a tapering scraper tip extending from the base, having an inner surface and an outer surface tapering towards the inner surface, the inner surface of the tapering scraper tip terminating in a non-linear scraping edge comprising two obliquely-extending portions that intersect at an obtuse angle to define a channel for channeling debris towards the outer surface.

2. The scraper of claim 1, wherein the inner surface is curved, the outer surface is curved, and the tapering scraper tip further includes flat side surfaces between the inner surface and outer surface that taper towards a tip end.

3. The scraper of claim 2, wherein the intersection of the obliquely-extending portions is halfway between the flat side surfaces.

4. The scraper of claim 2, wherein the outer curved surface terminates in an outer edge having two obliquely-extending portions that intersect at an obtuse angle.

5. The scraper of claim 4, further comprising channeling surfaces extending between the non-linear scraping edge and the outer edge and forming sides of the channel.

6. The scraper of claim 5, wherein the channeling surfaces twist away from the inner curved surface between the flat side surfaces and a central nadir.

7. The scraper of claim 2, wherein the obliquely-extending portions extend from the intersection to the flat side surfaces.

8. The scraper of claim 2, wherein the inner curved surface extends through an arc of about 90°.

9. A scraper for a conveyor belt, comprising:
   a base; and
   a tapering scraper tip extending from the base, the tapering scraper tip comprising a curved inner surface extending from the base, an outer surface opposing the curved inner surface, tapering side surfaces between the curved inner surface and outer surface and channeling surfaces extending between top edges of the curved inner surface and the outer surface, wherein the channeling surfaces taper in thickness from a wide base in a middle portion of the top edges to channeling surface tips close to the tapering side surfaces.

10. The scraper of claim 9, wherein the top edges of the curved inner surface and outer surface are v-shaped.

11. The scraper of claim 9, wherein the top edge of the curved inner surface comprises two obliquely-extending portions that intersect at an obtuse angle to form a channel.

12. The scraper of claim 11, wherein the top edge of the outer surface comprises two obliquely-extending portions that intersect at an obtuse angle.

13. The scraper of claim 12, wherein the nadir of the outer surface top edge is lower than the nadir of the curved inner surface top edge.

14. A conveyor for conveying product, comprising:
a frame;
a reversing element coupled to the frame;
a conveyor belt trained around the reversing element; and
a scraper for removing material from the conveyor belt, the scraper having a scraper tip having a curved inner surface abutting the conveyor belt, the curved inner surface terminating in a non-linear scraping edge, the scraper further comprising an outer surface opposing the inner surface and terminating in a non-linear edge, the non-linear edge of the outer surface having a nadir below a nadir of the non-linear scraping edge.

15. The conveyor of claim 14, wherein the scraper is mounted to the frame.

16. The conveyor of claim 14, wherein the curved inner surface extends through an arc of about 90°.

17. The conveyor of claim 14, wherein the non-linear scraping edge comprises two obliquely-extending portions that intersect at an obtuse angle to define a channel.

18. The conveyor of claim 14, wherein the scraper tip further comprises tapering side surfaces between the curved inner surface and the curved outer surface, and twisting channeling surfaces extending between top edges of the curved inner surface and the curved outer surface.

19. The scraper of claim 5, wherein each channeling surface tapers from a wider portion at a bottom of the channel to a thinner portion at a tip near a flat side surface of the scraper.

20. The scraper of claim 4, wherein the intersection of the obliquely-extending portions on the outer edge is below the intersection of the obliquely-extending portions of the scraping edge.

21. The scraper of claim 9, wherein each channeling surface twists away from the curved inner surface between a channeling surface tip and a wide base.

* * * * *